April 11, 1961 E. R. MARTIN 2,979,648
MOTOR CONTROL ASSEMBLY
Original Filed July 2, 1956
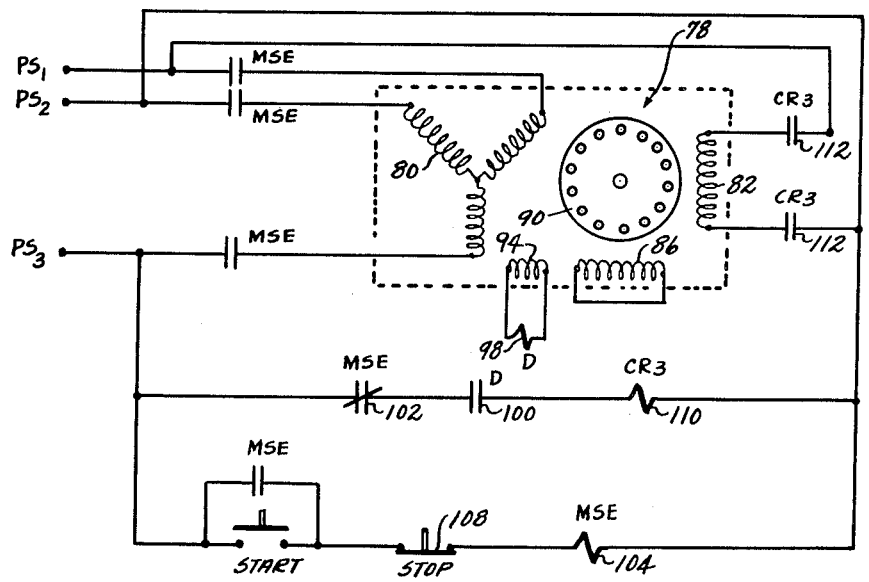
INVENTOR.
EDWIN R. MARTIN
BY
Dybvig and Jacox
HIS ATTORNEYS — # United States Patent Office 2,979,648
Patented Apr. 11, 1961

2,979,648
MOTOR CONTROL ASSEMBLY

Edwin R. Martin, Ann Arbor, Mich., assignor to Standard Dayton Corporation, Dayton, Ohio, a corporation of Ohio Original application July 2, 1956, Ser. No. 595,538, now Patent No. 2,906,935, dated Sept. 29, 1959. Divided and this application May 7, 1959, Ser. No. 811,690

9 Claims. (Cl. 318—211)

This invention relates to a motor control assembly. The invention relates more particularly to a motor control assembly for use with a motor which has internal electrical braking components. The invention relates more particularly to a motor control assembly for use in connection with a motor constructed according to the invention disclosed in the Noodleman Patent No. 2,637,059. However, the invention is not so limited due to the fact that the motor control assembly of this invention may be used with other types of motors and with other types of electrical apparatus.

This application is a division of my copending application, Serial No. 595,538, filed July 2, 1956, now Patent No. 2,906,935.

In a motor, such as a motor built according to the invention disclosed in the Noodleman Patent No. 2,637,059, it is desirable in the operation of the motor to control the energization of the braking winding so that the braking winding is automatically deenergized when the rotor of the motor is at zero speed.

An object of this invention is to provide a motor control assembly which may be used to automatically cause rapid deceleration of a motor.

Another object of this invention is to provide a motor control assembly which automatically causes a motor to stop when the main running winding is deenergized.

Another object of the invention is the provision of a motor control assembly which is automatically deenergized when the motor reaches zero speed.

Other objects and advantages reside in the construction of parts, the combination thereof, the mode of operation, and the method of manufacture, as will become more apparent from the following description.

In the drawing:

The figure is a schematic circuit diagram showing a motor control assembly of this invention.

Referring to the drawing in detail, for purposes of illustration, a motor control assembly of this invention is shown in the figure in connection with a three-phase Y connected motor. It is to be understood, however, that the invention is equally applicable to other types of electric machines, such as single-phase motors or three-phase delta connected motors and other types of electric motors.

In the figure of the drawing a motor 78 is shown provided with a main running winding 80 and an auxiliary winding 82. A third winding 86 is disposed 90 electrical degrees with respect to the auxiliary winding 82 and forms a two-phase winding with the auxiliary winding 82. The third winding 86 is noninductively wound with respect to the main winding 80 and is shown herein as being closed on itself by means of a conductor. The third winding 80 is so wound that the algebraic sum of all the voltages induced therein by the main winding 80 is substantially zero.

The motor 78 is provided with a rotor 90 which may be of the squirrel cage type or wound rotor type or of any other suitable type. Thus, the motor 70 may be similar to a motor built according to the Noodleman Patent No. 2,627,059. As discussed in the said patent, the arrangement of the windings such as the windings 82 and 86 is such that they establish a field having a larger number of poles than the number of poles produced by the main stator winding 80.

By virtue of the arrangement of the stator windings, the synchronous speed of the motor 78 energized by the running winding or main stator winding 80 may be several times as great as the synchronous speed of the motor 78 when energized solely through the auxiliary winding 82.

When the auxiliary winding 82 is energized, the current flow within the winding 86, induced through rotation of the rotor 90, becomes of sufficient value to cause rapid deceleration of the rotor 90, and causes the rotor 90 to stop.

The motor 78 also includes a fourth stator winding 94 which preferably has a small number of turns and is inductively wound with respect to the main running winding 80 and is inductively wound with respect to the third winding 86. The stator winding 94 may be referred to as a control winding due to the fact that an operating coil 98 of a control relay D is connected to the winding 94. Thus, when the main running winding 80 is energized from power supply lines PS1, PS2, and PS3 by means of a master switch MSE, as shown, the stator winding 94 is energized, causing energization of the operating coil 98 of the control relay D. This causes closing of a normally open contact 100 of the control relay D which has a normally closed contact 102 of the master switch MSE in series therewith. The contact 102 opens when an operating coil 104 of the master switch MSE is energized. Thus, when a stop button 108 in series with the operating coil 104 of the master switch MSE is depressed, the contact 102 closes, causing energization of an operating coil 110 of a control relay CR3. The control relay CR3 is provided with normally open contacts 112 which close upon energization of the operating coil 110.

Thus, when the main running winding 80 is energized by operation of the master relay MSE, the stator winding 94 has voltage induced therein which energizes the operating coil 98 of the relay D. This causes the contact 100 to close, but since the contact 102 opens with operation of the master switch MSE, the operating coil 110 remains deenergized. However, when the stop button 108 is depressed the contact 102 closes with opening of the MSE contactors which connect to the main winding 80. Thus, the coil 110 of the relay CR3 is energized through contacts 102 and 100 and the contacts 112 are closed. This energizes the auxiliary winding 82.

When the auxiliary winding 82 is energized, the winding 86 becomes energized through rotation of the rotor 90. Thus, the rotor 90 is quickly stopped. Due to the fact that the control winding 94 is inductively wound with respect to the third winding 86, the control winding 94 is energized during energization of the third winding 86. Therefore, when the rotor 90 is brought to a stop, the control winding 94 is deenergized causing deenergization of the operating coil 98 of the relay D. With deenergization of the coil 98 of the relay D the contact 100 opens deenergizing operating coil 110 of the relay CR3, permitting the contacts 112 to open, deenergizing the auxiliary winding 82. Thus, all of the portions of the control assembly are deenergized.

Thus, it is to be understood that by means of a control assembly of this invention a motor may be automatically and quickly stopped and the braking circuit automatically deenergized.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a control assembly for an electric motor of the type having a stator, a rotor, the stator being provided with a main winding arranged to establish a given number of poles, the stator also having a two-phase brake winding arranged to establish a different number of poles, a source of electrical energy, separate control winding means in the stator inductively coupled with respect to the main stator winding and with respect to the brake winding, the control winding being energized during energization of the main stator winding and during energization of the brake winding during rotation of the rotor, control means connected to the control winding means for connection of a portion of the brake winding to a source of electrical energy, energization of said portion of the brake winding causing stopping of the motor, said control means automatically deenergizing said portion of the brake winding when the motor is stopped.

2. In a control assembly for an induction motor of the type having a stator, a rotor, the stator being provided with a main stator winding arranged to establish a given number of poles, the stator also having a two-phase brake winding arranged to establish a different number of poles, a source of electrical energy, a main contactor connecting the main stator winding to the source of electrical energy, a separate control winding disposed in the stator and inductively wound with respect to the main stator winding and with respect to a portion of the brake winding, an auxiliary contactor connecting one phase of the brake winding to the source of electrical energy, and means controlled by the control winding for operation of the auxiliary contactor.

3. In a control assembly for an induction motor of the type having a stator, a rotor, the stator being provided with a main winding arranged to establish a given number of poles, the stator also having a two-phase brake winding arranged to establish a different number of poles, a source of electrical energy, a separate control winding disposed within the stator and inductively coupled with respect to the main stator winding and with respect to one phase of the two-phase brake winding, master switch means for connection of the main stator winding to a source of electrical energy, and means operable by the control winding and by the master switch means for connecting the other phase of the two-phase brake winding to a source of electrical energy.

4. In a control assembly for an electric motor of the type having a stator, a rotor, the stator being provided with a main winding arranged to establish a given number of poles, the stator also having a brake winding arranged to establish a different number of poles, a source of electrical energy, separate control winding means in the stator inductively coupled with respect to the main stator winding and with respect to the brake winding, the control winding means being energized during energization of the main stator winding and during energization of the brake winding during rotation of the rotor, control means connected to the control winding means for connection of the brake winding to a source of electrical energy, energization of said brake winding causing stopping of the motor, said control means automatically deenergizing said brake winding when the motor is stopped.

5. In a control assembly for an induction motor of the type having a stator, a rotor, the stator being provided with a main stator winding arranged to establish a given number of poles, the stator also having a brake winding arranged to establish a different number of poles, a source of electrical energy, a main contactor connecting the main stator winding to the source of electrical energy, a separate control winding disposed in the stator and inductively wound with respect to the main stator winding and with respect to the brake winding, the control winding being energized during energization of the main stator winding and during energization of the brake winding during rotation of the rotor, an auxiliary contactor connecting the brake winding to the source of electrical energy, and means controlled by the control winding for operation of the auxiliary contactor.

6. In a control assembly for an induction motor of the type having a stator, a rotor, the stator being provided with a main winding arranged to establish a given number of poles, the stator also having a brake winding arranged to establish a different number of poles, a source of electrical energy, a separate control winding disposed within the stator and inductively coupled with respect to the main stator winding and with respect to the brake winding, the control winding being energized during energization of the main winding and during energization of the brake winding during rotation of the rotor, master switch means for connection of the main stator winding to a source of electrical energy, and means operable by the control winding and by the master switch means for connecting the brake winding to a source of electrical energy.

7. A control assembly for an induction motor having a stator and a rotor, the stator being provided with a main stator winding arranged to establish a given number of poles, the stator also having a brake winding arranged to establish a different number of poles, the brake winding having two portions, a source of electrical energy, comprising a main switch connecting the main stator winding to the source of electrical energy, an auxiliary switch connecting a portion of the brake winding to the source of electrical energy, a separate control winding in the stator and inductively wound with respect to the main winding, the control winding also being energized during energization of the brake winding with rotation of the rotor, a relay, the relay having a coil connected across the control winding, an electromagnetic device operatively connected to the auxiliary switch, the main switch having a normally closed auxiliary contact operable therewith, the relay having normally closed contacts, said contacts and said auxiliary contact connected in series with the electromagnetic device and connected to the source of electrical energy, the rotor rotating when the main winding is connected to the source of electrical energy by means of closing of the main contactor, the brake winding being energized upon opening of the main contactor, the brake winding being energized until the rotor reaches zero speed.

8. A control assembly for an electric motor having a stator and a rotor, the stator being provided with a main winding arranged to establish a given number of poles, the stator also having a brake winding arranged to establish a greater number of poles, a source of electrical energy, comprising a main switch connecting the source of electrical energy to the main winding, an auxiliary switch connecting the brake winding to the source of electrical energy, a separate control winding in the stator inductively coupled with respect to the main winding, the control winding also being disposed ninety electrical degrees with respect to a portion of the brake winding so that the control winding is energized upon energization of the brake winding with rotation of the rotor, a relay coil connected across the control winding, a normally closed contact operable with the main switch, a normally open contact operable by energization of the relay coil, an electromagnetic operator for the auxiliary switch, the electromagnetic operator and the normally closed contact and the normally open contact being connected in series and connected to the source of electrical energy, closing of the main switch causing energization of the main winding and rotation of the rotor, deenergization of the main winding by opening of the main switch causing energization of the brake winding, the brake winding being energized until the rotor is stopped.

9. In combination with an induction motor having a stator and a rotor, the stator having a main winding and a two-phase brake winding, one phase of the brake winding being closed on itself, a control assembly comprising a main contactor for connecting the main winding to a source of electrical energy, an auxiliary contactor for connecting the other phase of the brake winding to a source of electrical energy, a separate control winding disposed in the stator and inductively wound with respect to the main winding and inductively wound with respect to the phase of the two-phase winding which is closed on itself, an electromagnetic operator mechanically connected to the auxiliary switch for closing thereof, a normally closed contact operable with the main switch, a control relay connected to the control winding and having a normally open contact, the electromagnetic operator and the normally closed contact and the normally open contact being connected in series, there being conductor means for connection of the series to a source of electrical energy.

References Cited in the file of this patent

UNITED STATES PATENTS

| | | |
|---|---|---|
| 1,315,965 | Jennings | Sept. 16, 1919 |
| 1,991,035 | Werner | Feb. 12, 1935 |
| 2,828,457 | Noodleman | Mar. 25, 1958 |
| 2,858,365 | Martin et al. | Nov. 4, 1958 |